United States Patent Office 3,318,009
Patented May 9, 1967

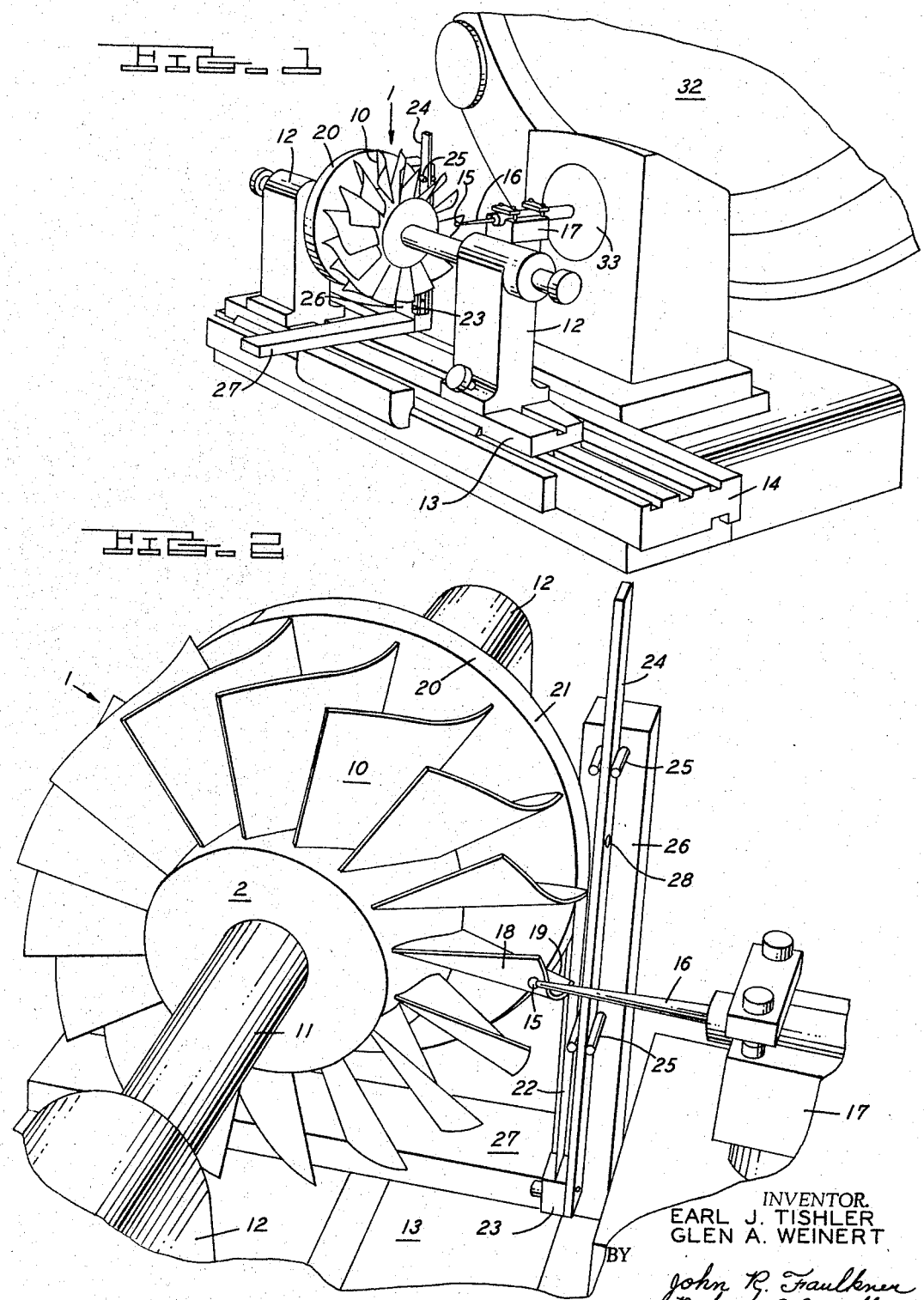

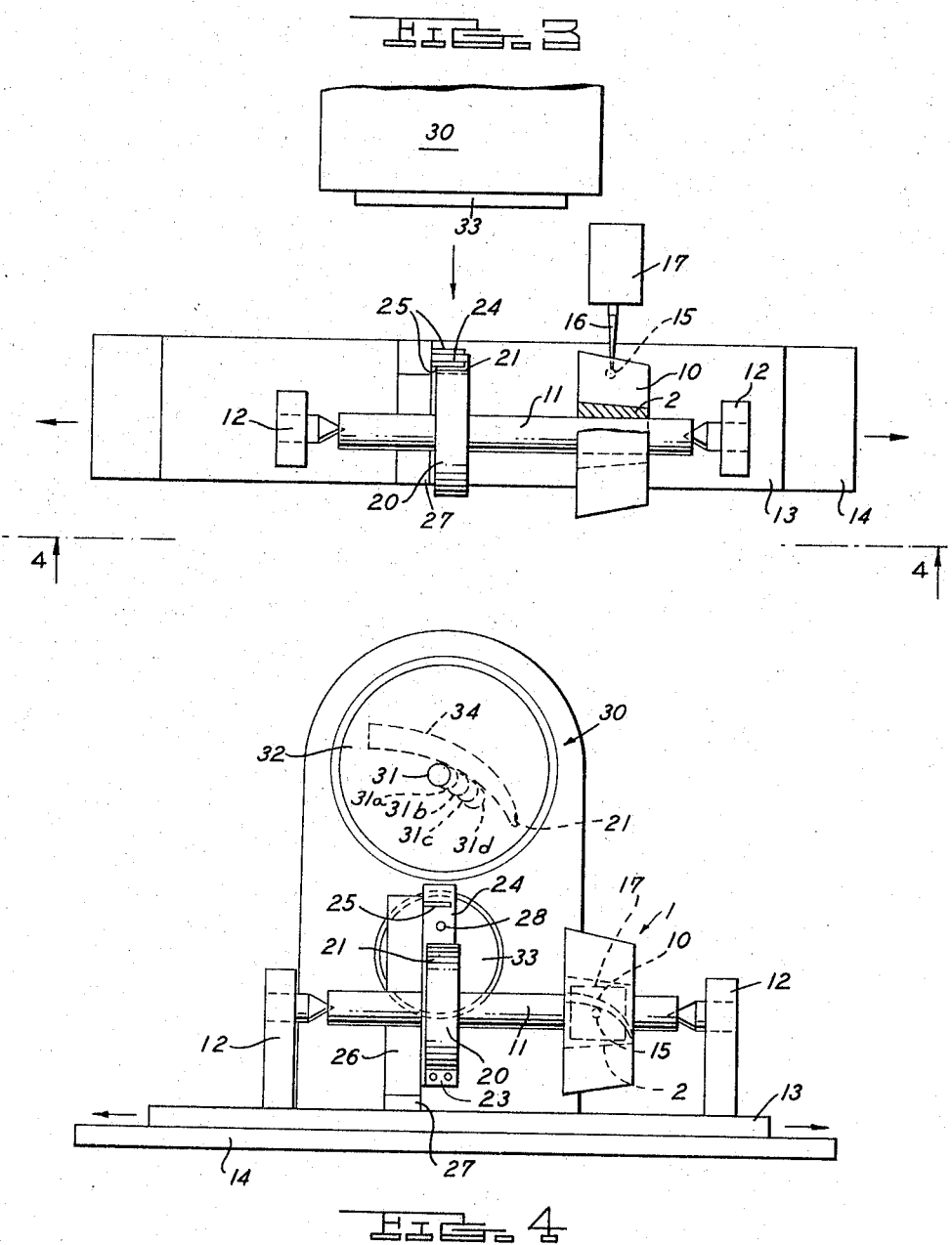

3,318,009
BLADE EXAMINING APPARATUS
Earl J. Tishler, Dearborn, and Glen A. Weinert, Detroit, Mich., assignors to Ford Motor Company, Dearborn, Mich., a corporation of Delaware
Filed Dec. 10, 1964, Ser. No. 417,352
6 Claims. (Cl. 33—174)

This invention relates to an apparatus for examining the cross-sectional contour of a curved blade, such as, for example, those used in gas turbine engines. More particularly, the invention relates to such an apparatus that permits examination of closely spaced, small diameter curved blades.

Devices are known for traversing the surface of a curved blade and projecting this tracing upon a screen for visual inspection of the cross-sectional contour. However, substantially all of the known devices use movable probes or feelers, and are usually capable of inspecting the blade contour only of large diameter rotors where the blades are widely spaced. The reason for this is because of the necessary movements of the probe over the curved surface. Sufficient space must be provided between adjacent blades to permit the probe to reach all radii of the blade. In very small diameter turbine rotors, for example, such as are used in automotive vehicle installations, the turbine blades or stator vanes are very closely spaced. As a result, there is no practical way for tracing all of the cross-sectional contours of such a blade by means of a movable probe without removing some of the blades on adjacent sides or without considering a single blade mounted by itself in space.

The invention provides an apparatus for inspecting the contour of a blade regardless of its size or how closely spaced the blades are, without removing the blade from its operative position. It does this by imparting a combined rotational and axial sliding movement to the blade against a stationary probe that can traverse any cross section of the blade. This combined movement in two directions of the blade is translated into combined vertical and horizontal movements of an apertured slide member that has a circle reticle. The reticle cooperates with an optical projecting means that projects the moving image of the reticle on a screen as the blade surface is traversed by the probe. The screen can be equipped with an etching or tracing of a design cross-sectional contour with which the image of the blade can be compared.

The invention, therefore, provides a simple apparatus for checking the contour of any blade without disassembling the blade from the apparatus of which it is a part regardless of the size or spacing of the blades.

It is an object of the invention, therefore, to provide an apparatus for examining the contour of a blade such as those that are used in turbine rotors or as stator vanes in gas turbine engines.

It is another object of the invention to provide a blade inspecting device that can trace the contour of the blade and provide an image thereof on an optical projection device in a manner providing a visual comparison between the actual blade contour and design contour.

It is another object of the invention to provide a blade inspecting apparatus that is simple in construction; is easy to assemble and disassemble; permits a quick check of the blade contour against design profile; and is relatively light in weight and compact in design so that it is easily transportable.

Other objects, features and advantages will become apparent upon reference to the succeeding detailed description of the invention and to the drawings illustrating the preferred embodiment thereof; wherein, FIGURE 1 is a perspective view of the blade inspecting apparatus embodying the invention;

FIGURE 2 is an enlarged perspective view of a portion of the apparatus of FIGURE 1;

FIGURE 3 is a schematic plan view of the examining apparatus of FIGURE 1; and

FIGURE 4 is an elevational view taken on a plane indicated by and viewed in the direction of the arrows 4—4 of FIGURE 3.

FIGURES 1 and 2 show a blade examining apparatus including a test fixture 1, which in this case, is a turbine rotor 2 having a number of circumferentially spaced, curved profile blades 10 extending radially from it. The hub of the rotor is fixed to a shaft 11 having opposite ends rotatably mounted in spaced upright stanchions or supports 12. Both supports 12 are fixed to a slide base 13 that has a dovetail connection with a stationary base or platform 14. This connection permits a horizontal sliding movement of the turbine wheel with respect to platform 14.

Blades 10 of the turbine rotor are adapted to be contacted one at a time by the ball end 15 of a stationary probe 16. The probe is adjustably mounted on a support 17 and can be radially adjusted to contact any radius of blade 10. Although not shown, it is within the scope of the invention to also pivotally mounted the probe 16 so that it can contact the blade at any desired angle. This may be more convenient when checking the cross-sectional contour at the root of the blade, for example.

As thus far described, it will be readily apparent that a sliding axial movement of rotor wheel 2 with blade 10 contacting probe 16 will cause a simultaneous rotational movement to be imparted to blade 10 and rotor 2 due to the camming action of the blade surface 18 against probe end 15 as the blade moves in an axial direction. Conversely, by engaging probe end 15 with the trailing edge 19 of blade 10, rotating the blade will axially slide the rotor 2 as the blade surface moves across the probe end.

One of the purposes of the invention is to trace the movement of the blade at a particular cross section as it passes over the probe end, and visually show this path in comparison to a design contour for the blade at this cross section. The apparatus for converting the combined circumferential axial movement of the blade 10 as it is traversed by the probe end 15 into a combined axially and vertically moving image on an optical projecting means will now be described.

As seen in FIGURES 1, 3 and 4, a disc 20 is fixedly secured to shaft 11. The peripheral edge of this disc has a radius equal to the radius of the point of contact of blade 10 with the probe end 15 so that the circumferential distance traveled by the edge of disc 20 as it rotates with turbine wheel 2 is identical to the rotational distance moved by the blade 10 as at the point of contact its surface 18 moves over the probe end 15.

While disc 20 is shown as having a single fixed diameter edge equal to the diameter of the point of contact with the test blade, it will be readily apparent that it is within the scope of the invention to provide a disc with a stepped peripheral edge portion, each step of which has a different radius corresponding to a different radial cross section of the blade to be examined. It will also be apparent that a solid disc need not be provided since only a small portion of the arcuate periphery is needed to record the short circumferential distance traveled by the arcuate surface of blade 10. That is, the rotating member 20 could be a flat plate having a single radially extending portion, or several portions, so long as each portion has an outer edge that is an arc of a radius equal to the radius of the blade cross section under consideration.

Suitably secured to the edge of disc 20 is a motion transmitting tape 21 that extends circumferentially around the edge for slightly more than 90°, and then extends tangentially downwardly from the disc, as best seen in FIGURE 2 at 22. The end of the tape is fixed to a block or boss 23 that is fixed to the end of a vertically slidable plate 24. The plate is mounted between vertically spaced bars or guide members 25 projecting from a support 26. The support 26 is fixed to an additional support 27 at right angles to it, the latter support being rigidly connected to the slide base 13.

The plate 24 is vertically positioned so that its longitudinal axis is parallel or substantially parallel to the tangential extension of tape 21. With this arrangement, the rotary motion of member 20 is translated into a linear motion of the extension 22 to thereby cause a corresponding identical movement of the plate 24 in a vertical direction. Thus, when rotor wheel 2 and blade 10 are moved horizontally, causing blade 10 to rotate, the disc 20 and the slide plate 24 also move horizontally, and disc 20 rotates. This causes a vertical movement of plate 24.

Referring to FIGURE 4, plate 24 has an aperture 28 constituting a circular reticle. The reticle is adapted to cooperate with an optical projecting device 30 in a manner to cast a shadow image 31 on a screen 32. The image travels across the screen following the path defined by the movement of the slide plate 24 in the combined horizontal and vertical directions described. This is indicated by the various positions 31a, 31b, 31c, 31d corresponding to similar positions of probe end 15 with respect to blade 10.

The optical projecting device 30 is of a known type and further details, therefore, are not given since they are known and are believed to be unnecessary for an understanding of the invention. Suffice it to say, however, that a light source is projected out through a lens 33 against plate 24 and its reticle 28. The shadow image of the reticle and the reflection of the plate are transmitted back through lens 31 and other lenses, not shown, magnified, and projected onto a large screen 32, the shadow of the reticle appearing at a dot 31.

As a means of comparing the actual contour of blade 10 with the design contour, the design contour indicated by dotted line 34 can be etched on screen 32, or a transparency containing the design contour can be removably secured to the screen. It would be positioned so that the projected image 31 of reticle 28 would be matched to a corresponding position of the probe 16 against the curved surface 18 of blade 10.

The operation is believed to be clear from previous description. The probe 16 is first adjusted to a particular radius of blade 10 under consideration (corresponding to the radius of disc 20) and usually at one edge, although it can be placed at any point along the cross section and moved in either direction therefrom to trace the cross-sectional contour of the blade. The turbine wheel 2 is then moved horizontally by moving the base support 13 relative to platform 14. As it moves horizontally, blade surface 18 is cammed in a circumferential direction by the end 15 of the probe, thereby rotating rotor 2 at the same time that it is being moved axially; that is, the blade will actually move in somewhat of a diagonal direction. Since disc 20 and slide plate 24 are fixed for a horizontal sliding movement with rotor wheel 2, they are moved in this direction also.

At the same time, the rotation of disc 20 with rotor 2 causes a vertical movement of slide plate 24 to result in a somewhat diagonal movement of reticle 28 along the same path that is defined by the surface 18 of blade 10 moving over the probe end 15. The shadow image 31 of reticle 28 is simultaneously projected upon screen 32 where the template 34 of design curvature is adjusted to contact the initial starting point of the reticle image 31. Thereafter, as one surface 18 of blade 10 moves over the probe end 15, the reticle 28 will travel along the identical path, and a visual comparison between this path and the design path is obtained by the optical projection device. When the probe has traversed one complete side of the blade, the blade 10 and rotor 2 can be moved in combined horizontal and rotational directions to cause the blade edge to be traversed by the probe and then the opposite curvature of the blade traversed. In this manner, the complete cross-sectional contour of the blade at the particular radius chosen is provided. By suitably adjusting the position of the probe and changing the diameter of disc 20, other cross-sectional contours at other radii can be obtained.

From the foregoing, it will be seen that the invention provides a simple apparatus for readily checking the contour at any particular cross section of a blade without the necessity of isolating that blade from adjacent ones. It will also be seen that the above operation is accomplished by means of a simplified device converting the angular movement of a member into a linear movement. It will be clear that the slide member need not be positioned vertically as described, but could be in any relative position so long as the linear distance traveled is identical to the circumferential distance traveled by the blade over the probe.

While the invention has been illustrated in its preferred embodiment in the figures, it will be clear to those skilled in the arts to which the invention pertains that many changes and modifications may be made thereto without departing from the scope of the invention.

We claim:

1. An apparatus for examining the cross-sectional contour of a blade having a curved surface comprising, means mounting said blade for rotation about an axis and movement axially, a stationary probe contacting a point on the radius of said blade whereby axial movement of said blade effects a rotation of said blade by reaction of the curved surface of said blade against said probe, a slide member movable axially with said blade and being reciprocable in a different direction, means between said blade and slide members for transferring the circumferential travel of said blade against said probe to a corresponding travel of said slide member in said different direction, a reticle carried by said slide member consisting of a shadow casting aperture, a screen, and optical projection means cooperating with said aperture for projecting the moving image of said reticle onto said screen during a combined axial and different direction movement of said slide member effected by a combined rotational and axial movement of said blade as it is traversed by said probe whereby the path of movement of said image on said screen defines a cross-sectional contour of said blade at said radius.

2. An apparatus for examining the cross-sectional contour of a blade having a curved surface comprising, means mounting said blade for rotation about a horizontal axis and movement axially, a stationary probe contacting a point on the radius of said blade whereby axial movement of said blade effects a rotation of said blade by reaction of the curved surface of said blade against said probe, a slide member movable axially with said blade and being reciprocable in a vertical direction, means between said blade and slide member for transferring the rotational travel of said blade against said probe to a corresponding vertical movement of said slide member, a reticle carried by said slide member consisting of a shadow casting aperture, a screen, and optical projection means cooperating with said aperture for projecting the moving image of said reticle onto said screen during a combined vertical and horizontal movement of said slide member effected by a combined rotational and horizontal movement of said blade as it is traversed by said probe whereby the path of movement of said image on said screen defines a cross-sectional contour of said blade at said radius.

3. An apparatus for examining the cross-sectional contour of a blade having a curved surface comprising, means mounting said blade for rotation about an axis and movement axially, a stationary probe contacting a point on a radius of said blade whereby axial movement of said blade effects a rotation of said blade by reaction of the curved surface of said blade against said probe, a slide member movable axially with said blade and being reciprocable in a different direction, means operatively fixed to said blade for rotational and axial movements corresponding to the movement of the surface of said blade over said probe, said means having an arcuate edge portion of a radius equal to the radius at which said blade is contacted by said probe, further means connecting the edge portion of said first named means to said slide member for transferring the circumferential travel of said blade surface against said probe to a corresponding travel of said slide member in said different direction, a reticle carried by said slide member consisting of a shadow casting aperture, a screen, and optical projection means cooperating with said aperture for projecting the moving image of said reticle onto said screen during a combined axial and different direction movements of said slide member effected by a combined rotational and axial movement of said blade as its surface is traversed by said probe whereby the path of said image on said screen defines a cross-sectional contour of said blade at said radius.

4. An apparatus as recited in claim 3, said further means comprising tape-like motion transmitting means connected to said edge portion and a portion of said slide member, said tape-like means having a portion extending substantially parallel to the different direction axis of said slide member whereby said tape-like means portion and slide member move linearly together.

5. An apparatus for examining the cross-sectional contour of a blade having a curved surface comprising, means mounting said blade for rotation about a horizontal axis and movement axially, a stationary probe contacting a point on a radius of said blade whereby axial movement of said blade effects a rotation of said blade by reaction of the curved surface of said blade against said probe, a slide member movable horizontally with said blade and being reciprocable vertically, means operatively fixed to said blade for rotational and horizontal movements corresponding to the movements of said blade surface over said probe, said means having an arcuate edge portion of a radius equal to the radius at which said blade is contacted by said probe, further means connecting the edge portion of said first named means to said slide member for transferring the rotational travel of said blade surface against said probe to a corresponding vertical movement of said slide member, a reticle carried by said slide member consisting of a shadow casting aperture, a screen, and optical projection means cooperating with said aperture for projecting the moving image of said reticle onto said screen during a combined horizontal and vertical movement of said slide member effected by a combined rotational and axial movement of said blade as it is traversed by said probe whereby the path of movement of said image on said screen defines a cross-sectional contour of said blade at said radius, said further means comprising tape-like motion transmitting means connected to said edge portion and a portion of said slide member, said tape-like means having a portion extending substantially parallel to the vertical axis of said slide member whereby said tape-like means portion and slide member move vertically together.

6. An apparatus for visually examining the cross-sectional contour of the blades of a bladed member such as a turbine wheel having a plurality of circumferentially spaced blades extending radially therefrom and having curved surfaces comprising, a shaft secured to said wheel, a pair of spaced supports, means rotatably mounting said shaft in said supports, slide means mounting said supports for movement in a direction parallel to the axis of rotation of said shaft, a stationary probe engaging a point on a radius of one of said blades, means mounting said turbine and proble whereby axial movement of said supports and turbine and blades effects a traverse of a cross-section of said blade at said radius by a rotation of said blade by reaction of its curved surface against said probe, a member fixed to said shaft having a radially projecting portion with a peripheral arcuate edge of a radius equal to the radius of the point of contact of said blade and probe, a plate offset laterally from said shaft and fixed to said slide means, means mounting said plate for a linear movement in a direction substantially at right angles to the axis of rotation of said shaft, tape-like motion transmitting means connected between the edge of said member and a portion of said plate, the connection between said tape-like means and said plate being made between substantially parallel moving portions of said tape-like means and said plate whereby the arcuate movement of said edge effects a corresponding linear travel of said plate, a reticle carried by said plate consisting of a shadow casting aperature, a screen, and optical projection means cooperating with said aperture for projecting the moving image of said reticle onto said screen during the combined movements of said plate in two directions in response to combined rotational and axial movement of said turbine and blade as said blade surface is traversed by said probe whereby the path of movement of said image on said screen defines a cross-sectional contour of said blade at said radius.

References Cited by the Examiner
UNITED STATES PATENTS

| 2,451,155 | 10/1948 | DeBoer et al. | 33—174 X |
| 2,476,312 | 7/1949 | Luety | 33—174 X |

LEONARD FORMAN, *Primary Examiner.*

S. S. MATTHEWS, *Assistant Examiner.*